(12) United States Patent
Graf et al.

(10) Patent No.: US 11,691,071 B2
(45) Date of Patent: Jul. 4, 2023

(54) PERIPERSONAL BOUNDARY-BASED AUGMENTED REALITY GAME ENVIRONMENT

(71) Applicant: The Regents of the University of Michigan, Ann Arbor, MI (US)

(72) Inventors: Roland Graf, Ann Arbor, MI (US); Hun Seok Kim, Ann Arbor, MI (US); Sun Young Park, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 459 days.

(21) Appl. No.: 16/833,562

(22) Filed: Mar. 28, 2020

(65) Prior Publication Data
US 2020/0306624 A1 Oct. 1, 2020

Related U.S. Application Data

(60) Provisional application No. 62/826,814, filed on Mar. 29, 2019.

(51) Int. Cl.
*A63F 13/53* (2014.01)
*A63F 13/213* (2014.01)
(Continued)

(52) U.S. Cl.
CPC ............ *A63F 13/213* (2014.09); *A63F 13/26* (2014.09); *A63F 13/53* (2014.09); *A63F 13/426* (2014.09);
(Continued)

(58) Field of Classification Search
CPC .................... A63F 13/26; A63F 13/213; A63F 2300/8082; G06F 3/04815; G06F 3/012; G06T 19/006; A63B 71/0622
See application file for complete search history.

(56) References Cited

U.S. PATENT DOCUMENTS

| 8,049,750 B2 * | 11/2011 | Gloudemans | G06T 15/20 345/592 |
| 8,284,238 B2 * | 10/2012 | Stone | G06T 15/20 348/700 |

(Continued)

FOREIGN PATENT DOCUMENTS

| JP | 2004097662 A | 4/2004 |
| KR | 20180000006 A | 1/2018 |

(Continued)

OTHER PUBLICATIONS

ASB GlassFloor, Combining Sports Floors with LED, https://www.asbglassfloor.com/?lang=en, 2019.
(Continued)

*Primary Examiner* — Steven J Hylinski
(74) *Attorney, Agent, or Firm* — Lempia Summerfield Katz LLC

(57) ABSTRACT

A method of providing an augmented reality game environment within a game space includes obtaining, by a processor, sensor data for the game space, determining, by the processor, a position of a player in the game space based on the sensor data, generating, by the processor, player image data of a peripersonal boundary of the player based on the determined position of the player for rendering a representation of the peripersonal boundary in the game space, the peripersonal boundary being disposed about, and spaced from, the determined position, obtaining, by the processor, player data for the player via an input modality, the player data being indicative of a player directive to modulate the peripersonal boundary, adjusting, by the processor, a size of the peripersonal boundary as a function of the player data, and updating, by the processor, the player image data based on the adjusted size of the peripersonal boundary.

22 Claims, 10 Drawing Sheets

(51) Int. Cl.
  *A63F 13/26* (2014.01)
  *A63F 13/426* (2014.01)
  *A63F 13/428* (2014.01)
(52) U.S. Cl.
  CPC ....... *A63F 13/428* (2014.09); *A63F 2300/643* (2013.01); *A63F 2300/8082* (2013.01)

(56) References Cited

U.S. PATENT DOCUMENTS

| | | | |
|---|---|---|---|
| 9,111,326 B1* | 8/2015 | Worley, III | G06V 40/113 |
| 9,814,982 B2* | 11/2017 | Chuaypradit | A63F 13/577 |
| 9,919,206 B2* | 3/2018 | Kim | A63F 13/5375 |
| 10,921,878 B2* | 2/2021 | Noris | G06F 3/011 |
| 2002/0143414 A1* | 10/2002 | Wilcock | G11B 19/025 |
| | | | 381/92 |
| 2002/0151997 A1* | 10/2002 | Wilcock | G06F 3/167 |
| 2009/0221374 A1* | 9/2009 | Yen | A63F 13/211 |
| | | | 463/42 |
| 2011/0193939 A1* | 8/2011 | Vassigh | G06F 3/011 |
| | | | 348/169 |
| 2012/0069131 A1* | 3/2012 | Abelow | G06Q 10/10 |
| | | | 345/589 |
| 2012/0154425 A1* | 6/2012 | Kim | A63F 13/65 |
| | | | 345/592 |
| 2012/0249831 A1* | 10/2012 | Porter | H04N 5/272 |
| | | | 348/222.1 |
| 2013/0005467 A1* | 1/2013 | Kim | G06F 3/011 |
| | | | 463/36 |
| 2013/0007616 A1* | 1/2013 | Bell | G06F 3/017 |
| | | | 715/709 |
| 2013/0044129 A1* | 2/2013 | Latta | H04N 13/344 |
| | | | 345/633 |
| 2013/0084970 A1* | 4/2013 | Geisner | A63F 13/86 |
| | | | 463/31 |
| 2013/0196759 A1* | 8/2013 | Kim | A63F 13/533 |
| | | | 463/31 |
| 2013/0225296 A1* | 8/2013 | Kim | A63F 13/537 |
| | | | 463/37 |
| 2015/0206351 A1* | 7/2015 | Abercrombie | G06F 3/013 |
| | | | 345/419 |
| 2017/0151484 A1 | 6/2017 | Reilly et al. | |
| 2018/0333643 A1 | 11/2018 | Luisi et al. | |
| 2018/0373412 A1* | 12/2018 | Reif | G06F 3/04815 |
| 2019/0340909 A1* | 11/2019 | Nguyen | G08B 21/02 |

FOREIGN PATENT DOCUMENTS

| | | |
|---|---|---|
| KR | 20180100426 A | 9/2018 |
| WO | 2004042666 A2 | 5/2004 |
| WO | 2016094893 A1 | 6/2016 |

OTHER PUBLICATIONS

Bassolino et al., "Everyday use of the computer mouse extends peripersonal space representation", Neuropsychologia 48, 2010, pp. 803-811.
Biggio et al., "This racket is not mine: The influence of the tool-use on peripersonal space", Neuropsychologia 103, 2017, pp. 54-58.
Carrington et al., "Wearables and Chairabies: Inclusive Design of Mobile Input and Output Techniques for Power Wheelchair Users", Proceedings of the SIGCHI Conference on Human Factors in Computing Systems (CHI 14), 2014, pp. 3103-3112.
Cibrian et al., "Hunting Relics: A Persuasive Exergame to Promote Collective Exercise in Young Children", International Journal of Human-Computer Interaction, Jan. 4, 2016, 32:3, pp. 277-294.
Cooper et al., "Adaptive Sports Technology and Biomechanics: Wheelchairs", Paralympic Sports Medicine and Science, Aug. 2014, vol. 6, Issue 8S, pp. S31-S-39.
Cuzzort et al., "AstroWheelie: A wheelchair based exercise game", Proceedings of the 2008 12th IEEE International Symposium on Wearable Computers (ISWC '08), 2008, pp. 113-114.

Edey et al., "Powered to Play: A mixed reality game for people driving powered chairs", 2014 IEEE Games Media Entertainment, 2014, pp. 1-8.
Galli et al., "The wheelchair as a full-body tool extending the peripersonal space", Frontiers in Psychology, May 2015, 11 pages, vol. 6, Article 639.
Gerling et al., "Designing Movement-based Play With Young People Using Powered Wheelchairs", Proceedings of the 2016 CHI Conference on Human Factors in Computing Systems (CHI '16), 2016, pp. 4447-4458.
Gerling et al., "Designing Wheelchair-Based Movement Games", ACM Transactions on Accessible Computing, Mar. 2015, 23 pages, vol. 6, No. 2, Article 6.
Gerling et al., "Effects of Skill Balancing for Physical Abilities on Player Performance, Experience and Self-Esteem in Exergames", Proceedings of the SIGCHI Conference on Human Factors in Computing Systems (CHI '14), 2014, pp. 2201-2210.
Graf et al., "Solar Pink Pong: Street Video Game", Proceedings of the Ninth International Conference on Tangible, Embedded, and Embodied Interaction (TEI '15), Jan. 2015, pp. 417-418.
Grønbæk et al., "iGameFloor—A Platform for Co-Located Collaborative Games", Proceedings of the international conference on Advances in computer entertainment technology (ACE '07), Jun. 2007, pp. 64-71.
GuÐmundsdóttir et al., "Designing Games for Children with Cerebral Palsy", Games for Health, 2013, 18 pages.
Hernandez et al., "Design of an Exergaming Station for Children with Cerebral Palsy", Proceedings of the SIGCHI Conference on Human Factors in Computing Systems (CHI '12), May 2012, pp. 2619-2628.
Hernandez et al., "Designing Action-based Exergames for Children with Cerebral Palsy", Proceedings of the SIGCHI Conference on Human Factors in Computing Systems (CHI '13), 2013, pp. 1261-1270.
Holmes et al., "The body schema and the multisensory representation(s) of peripersonal space", Cognitive Processing, Jun. 2004, vol. 5, Issue 2.
Jeffress et al., "Opportunities and Benefits for Powerchair Users Through Power Soccer", Adapted Physical Activity Quarterly, 2017, pp. 235-255, vol. 34.
Jensen et al., "Design Strategies for Balancing Exertion Games: A Study of Three Approaches", Proceedings of the 2016 ACM Conference on Designing Interactive Systems (DIS '16), Jun. 2016, pp. 936-946.
Jesse Schell, "The Art of Game Design. A Book of Lenses", Book, 2015, Taylor & Francis Group, LLC, Boca Raton, FL.
Katherine Isbister, "Enabling Social Play: A Framework for Design and Evaluation", Evaluating User Experience in Games, Human-Computer Interaction Series, 2010, pp. 11-22.
Kellis et al., "Biomechanical characteristics and determinants of instep soccer kick", Journal of Sports Science and Medicine, 2007, vol. 6, pp. 154-165.
King et al., "The Enjoyment of Formal and Informal Recreation and Leisure Activities: A comparison of school-aged children with and without physical disabilities", International Journal of Disability, Development and Education, 2009, pp. 109-130, vol. 56, No. 2.
Krogh et al., "'Help Me Pull That Cursor'—A Collaborative Interactive Floor Enhancing Community Interaction", Proceedings of OZCHI, Dec. 2004, pp. 75-87.
Lees et al., "The biomechanics of soccer: A review", Journal of Sports Sciences, 1998, pp. 211-234, vol. 16.
Malone et al., "Active Videogaming in Youth with Physical Disability: Gameplay and Enjoyment", Games for Health Journal, 2016, pp. 333-341, vol. 5, No. 5.
Mihaly Csikszentmihalyi, "Flow: The Psychology of Optimal Experience", Book, First Edition, 1990, Harper & Row, New York.
Miller et al., "Adaptive Sports and Recreation", Pediatric Rehabilitation, 2015, pp. 197-216, Chapter 9.
Missiuna et al., "Play Deprivation in Children with Physical Disabilities: The Role of the Occupational Therapist in Preventing Secondary Disability", American Journal of Occupational Therapy, Oct. 1991, pp. 882-888, vol. 45, No. 10.

(56) References Cited

OTHER PUBLICATIONS

Mora-Guiard et al., "Sparking social initiation behaviors in children with Autism through full-body Interaction", International Journal of Child-Computer Interaction, 2017, pp. 62-71, vol. 11.
Mueller et al., "Designing Sports: A Framework for Exertion Games", Proceedings of the SIGCHI Conference on Human Factors in Computing Systems (CHI '11), May 2011, pp. 2651-2660.
Müller et al., "BaseLase: An Interactive Focus + Context Laser Floor", Proceedings of the 33rd Annual ACM Conference on Human Factors in Computing Systems (CHI '15), Apr. 2015, pp. 3869-3878.
Noel et al., "Peripersonal Space as the space of the Bodily Self", Cognition, Nov. 2015, vol. 144, pp. 49-57.
O'Connor et al., "Evaluation of a Manual Wheelchair Interface to Computer Games", Neurorehabilitation and Neural Repair, 2000, pp. 21-31, vol. 14, No. 1.
Persson et al., "Universal design, inclusive design, accessible design, design for all: different concepts—one goal? On the concept of accessibility—historical, methodological and philosophical aspects", Univ Access Info Soc, 2015, pp. 505-526, vol. 14.
Rimmer et al., "Obesity and Secondary Conditions in Adolescents with Disabilities: Addressing the Needs of an Underserved Population", Journal of Adolescent Health, 2007, pp. 224-229, vol. 41.
Segura et al., "Enabling Co-Located Physical Social Play: A Framework for Design and Evaluation", Game User Experience Evaluation, 2015, pp. 209-238.
Solish et al., "Participation of Children with and without Disabilities in Social, Recreational and Leisure Activities", Journal of Applied Research in Intellectual Disabilities, 2010, pp. 226-236, vol. 23.
Steve Blank, Jerry Engel, Jim Hornthal. 2014. LeanLaunchPad. Evidence-Based Entrepreneurhip Educators Guide 6th Edition.
Sweetser et al., "GameFlow: A Model for Evaluating Player Enjoyment in Games", ACM Computers in Entertainment, Jul. 2005, 24 pages, vol. 3, No. 3, Article 3A.
Takahashi et al., "FUTUREGYM: A gymnasium with interactive floor projection for children with special needs", International Journal of Child-Computer Interaction, 2018, pp. 37-47, vol. 15.
Van Delden et al., "A Thing of Beauty: Steering Behavior in an Interactive Playground", Proceedings of the 2017 CHI Conference on Human Factors in Computing Systems (CHI '17), May 6-11, 2017, pp. 2462-2472.
Van Delden et al., "Co-located augmented play-spaces: past, present, and perspectives", Journal on Multimodal User Interfaces, Aug. 14, 2018, 31 pages.
Wiemeyer et al., "Recommendations for the Optimal Design of Exergame Interventions for Persons with Disabilities: Challenges, Best Practices, and Future Research", Games for Health Journal, 2015, pp. 58-62, vol. 4, No. 1.
Wyeth et al., "Stomp: An Interactive Platform for People with Intellectual Disabilities", Proceedings of the 8th International Conference on Advances in Computer Entertainment Technology (ACE '11), 2011, 8 pages.
International Preliminary Report on Patentability in International Patent Application No. PCT/US2020/025563, dated Oct. 14, 2021, 6 pages.
International Search Report and Written Opinion of the International Searching Authority in International Patent Application No. PCT/US2020/025563, dated Jul. 13, 2020, 9 pages.
Calle-Jimenez et al., "Accessible Map Visualization Prototype", Principles and Practices of Programming on the Java Platform: Virtual Machines, Languges, and Tools, Apr. 11, 2016, 2 pages.
Extended European Search Report from European Patent Application No. 20 78 3228, dated Nov. 25, 2022, 7 pages.
Graf et al., "iGYM: An Interactive Floor Projection System for Inclusive Exergame Environments", CHI PLAY'19, Proceedings of the Annual Symposium on Computer-Human Interaction in Play, Oct. 22-25, 2019, pp. 31-43, Barcelona, Spain.

\* cited by examiner

PERIPERSONAL BOUNDARY-BASED AUGMENTED REALITY GAME ENVIRONMENT

CROSS-REFERENCE TO RELATED APPLICATION

This application claims the benefit of U.S. provisional application entitled "Peripersonal Boundary-Based Augmented Reality Game Environment," filed Mar. 29, 2019, and assigned Ser. No. 62/826,814, the entire disclosure of which is hereby expressly incorporated by reference.

BACKGROUND OF THE DISCLOSURE

Field of the Disclosure

The disclosure relates to augmented reality game environments.

Brief Description of Related Technology

Through adaptive sports, people with disabilities learn compensatory strategies and transform their perceptions of self by building strength, flexibility, stamina, and an improved outlook on life. Some adaptive sports are wheelchair sports. An example is power soccer, a competitive team sport for users of motorized wheelchairs, who are unable to propel themselves in manual wheelchairs or perform the feats of upper-body strength that manual wheelchair sports require. Power soccer successfully builds on the players' capacities using their respective mobility aids and can serve a wide range of ages and abilities. Power soccer enables co-located physical play by optimally using all the resources at hand. However, power soccer has yet to explore opportunities for greater social integration in which people with disabilities play together with their non-disabled peers.

Active video games, or exergames, encourage physical activity by enabling players to use bodily movements to control the gameplay. The design of exergames for players with disabilities typically focuses on at least one of three different aspects: the games' socialization, entertainment, and rehabilitation outcomes. Exergames provide a way of improving motor skills and cardiovascular outcomes. Several game controllers and exergaming platforms are commercially available, i.e., Nintendo Wii, Sony Playstation3 Move, and Microsoft Xbox Kinect. A common limitation of exergames is that, regardless of system input accessibility, system output is always screen-based. In other words, much like conventional videogames, these games present single player scenarios or other scenarios in which multiple players face the same screen, which limits co-located play opportunities.

A sub-category of exergames for players with disabilities are wheelchair-based movement games, in which the wheelchair movement and position, as opposed to only the player's body movement, becomes part of the element that controls the game. As in the case of adaptive sports, wheelchair-based movement games can further be divided into games for power wheelchair users and games for manual wheelchair users. One example is Wheelchair Revolution, a competitive motion-based dancing game. Wheelchair Revolution provides players the option to use both a foot-based game input (i.e., a pressure sensing mat) and a wheelchair-based game input (i.e., kinect motion-monitoring system), with time and score balancing being used to account for individual player skills and abilities. However, the foot-based and wheelchair-based input modalities have very different characteristics that seem to emphasize player's differences. Further, the game forces both players to face a screen in front of them and stay within the close range of a motion monitoring system or on a pressure-sensing mat, which limits their range and degree of freedom, which would be impractical for co-located play.

As with adaptive sports, exergames have successfully enabled people with motor disabilities to enjoy the benefits of physical play. The benefits include an increased sense of empowerment, normalcy, and acquisition of social capital. However, exergames and adaptive sports typically fail to address the physical and social barriers that limit the opportunities for certain individuals, such as those with motor disabilities, to engage in physical play activities with their non-disabled peers. Likewise, exergames for people with motor disabilities often focus on improving a rehabilitation outcome, while failing to address needs for recreational exercise and social inclusion. Further, many popular exergame platforms (e.g., Nintendo Wii and Xbox Kinect) are screen-based, which is impractical for co-located play scenarios similar to adaptive sports or sport activities in general.

Interactive floors encourage physically active behavior by enabling co-located physical play. Interactive floors are typically deployed in the form of ceiling mounted projection and motion-monitoring systems. Interactive floors have been applied in connection with non-disabled players and players with cognitive disabilities, but not in connection with players with motor disabilities in inclusive settings.

SUMMARY OF THE DISCLOSURE

In accordance with one aspect of the disclosure, a method of providing an augmented reality game environment within a game space includes obtaining, by a processor, sensor data for the game space, determining, by the processor, a position of a player in the game space based on the sensor data, generating, by the processor, player image data of a peripersonal boundary of the player based on the determined position of the player for rendering a representation of the peripersonal boundary in the game space, the peripersonal boundary being disposed about, and spaced from, the determined position, obtaining, by the processor, player data for the player via an input modality, the player data being indicative of a player directive to modulate the peripersonal boundary, adjusting, by the processor, a size of the peripersonal boundary as a function of the player data, and updating, by the processor, the player image data based on the adjusted size of the peripersonal boundary.

In accordance with another aspect of the disclosure, a system for providing an augmented reality game environment within a game space includes a projection system to render images in the game space, a sensor system to capture sensor data for the game space, a processor coupled to the sensor system to receive the captured sensor data and to the projection system to control rendering of the images, a memory coupled to the processor and in which player detection instructions and image generation instructions are stored. The processor is configured via execution of the player detection instructions to determine a position of a player in the game space based on the sensor data. The processor is configured via execution of the image generation instructions to generate player image data of a peripersonal boundary of the player based on the determined position of the player and to direct the projection system to render the images in accordance with the player image data, the peripersonal boundary being disposed about, and spaced from, the determined position. The processor is further configured via the execution of the player detection instructions to obtain player data for the player via an input modality, the player data being indicative of a player directive to modulate the peripersonal boundary. The processor is further configured via the execution of the image generation instructions to adjust a size of the peripersonal boundary as a function of the player data and update the player image data based on the adjusted size of the peripersonal boundary.

In connection with any one of the aforementioned aspects, the systems, devices, and/or methods described herein may alternatively or additionally include any combination of one or more of the following aspects or features. The adjusted size of the peripersonal boundary includes an expansion of the peripersonal boundary, the expansion increasing a reach of the player to interact with a target object of the game space. The player data includes a controller signal from a controller, the controller signal being indicative of an actuation of the controller by the player. Adjusting the peripersonal boundary includes accessing a data store to obtain a player parameter, such that the function by which the peripersonal boundary is adjusted takes the player parameter as an input. The player parameter calibrates a speed of expansion of the peripersonal boundary. The player parameter calibrates a maximum size of expansion of the peripersonal boundary. The player parameter calibrates a duration of expansion of the peripersonal boundary. The player parameter calibrates an elasticity of the peripersonal boundary in connection with non-player-induced interaction of the peripersonal boundary with a target object. The input modality includes a sensor system such that the player data includes further sensor data. Adjusting the size of the peripersonal boundary includes determining, by the processor, that the further sensor data is indicative of an outward thrust of a limb of the player. The method further includes determining, by the processor, a position of a simulated object of the augmented reality game environment within the game space, generating, by the processor, object image data of the simulated object for rendering a representation of the simulated object in the game space, and updating the object image data based on a simulated interaction of the simulated object and the adjusted size of the peripersonal boundary. The method further includes rendering, by the processor, a visible representation of the player image data. The method further includes projecting, via a projection system, a representation of the player image data on a floor on which the game space is defined and on which the player moves. The adjusted size of the peripersonal boundary includes an expansion of the peripersonal boundary, the expansion increasing a reach of the player to interact with a target object of the game space. The system further includes a controller configured to be actuated by the player as the input modality, such that the player data includes a controller signal from the controller, the controller signal being indicative of an actuation of the controller by the player. The processor is further configured via the execution of the image generation instructions to access a data store to obtain a player parameter, such that the function by which the peripersonal boundary is adjusted takes the player parameter as an input. The player parameter calibrates a speed of expansion of the peripersonal boundary, a maximum size of expansion of the peripersonal boundary, a duration of expansion of the peripersonal boundary, or an elasticity of the peripersonal boundary. The sensor system provides the input modality for the player such that the player data includes further sensor data. The processor is further configured via the execution of the player detection instructions to determine that the further sensor data is indicative of an outward thrust of a limb of the player. The processor is further configured via the execution of the image generation instructions to determine a position of a simulated object of the augmented reality game environment within the game space, generate object image data of the simulated object for rendering, via the projection system, a representation of the simulated object in the game space, and update the object image data based on a simulated interaction of the simulated object and the adjusted size of the peripersonal boundary. The projection system is mounted above the game space such that the images are rendered on a floor on which the game space is defined and on which the player moves.

BRIEF DESCRIPTION OF THE DRAWING FIGURES

For a more complete understanding of the disclosure, reference should be made to the following detailed description and accompanying drawing figures, in which like reference numerals identify like elements in the figures.

Figure 1:
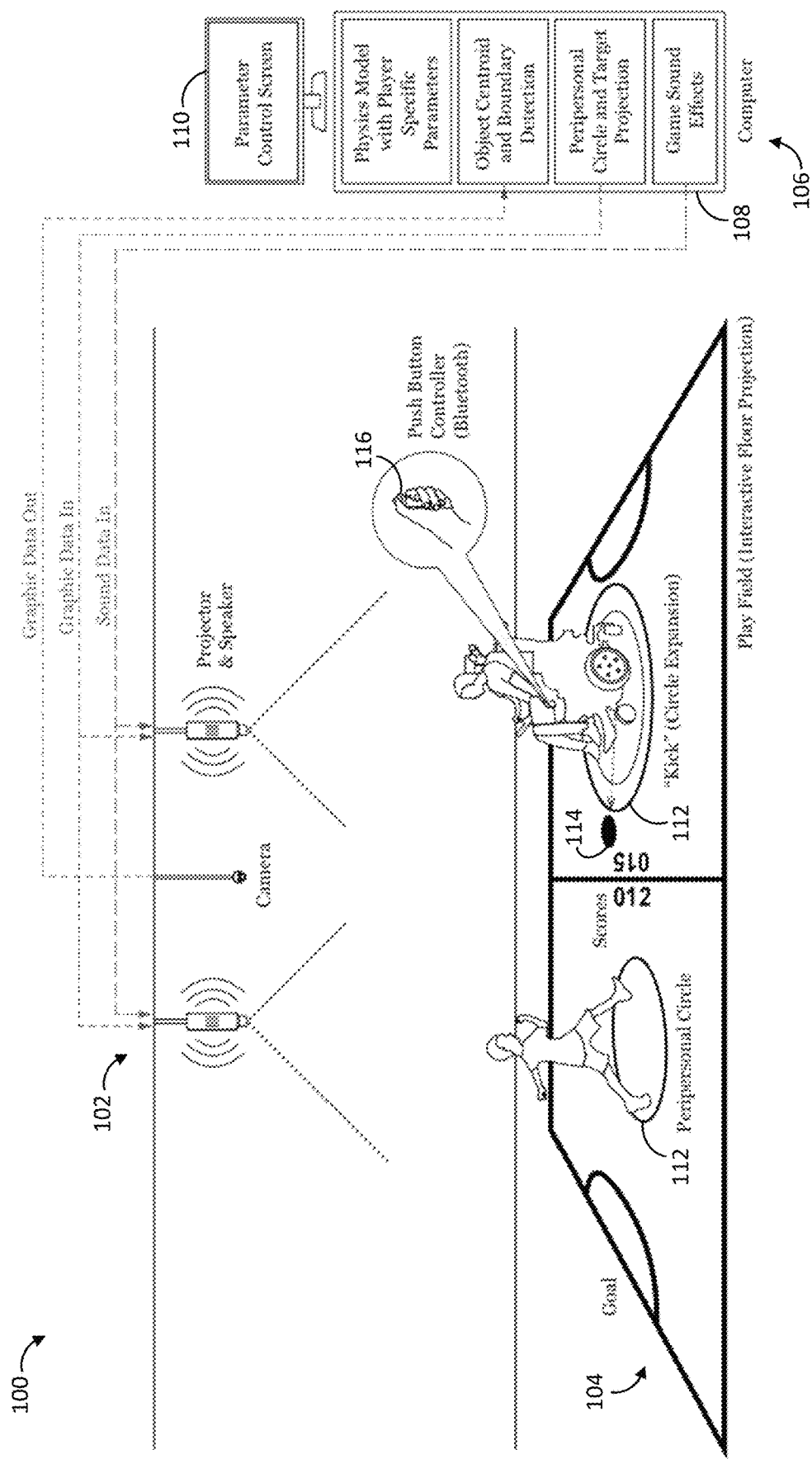
FIG. 1 is a schematic, perspective view of an exergame system configured to generate an augmented reality game environment in accordance with one example.

The embodiments of the disclosed systems, devices, and methods may assume various forms. Specific embodiments are illustrated in the drawing and hereafter described with the understanding that the disclosure is intended to be illustrative. The disclosure is not intended to limit the invention to the specific embodiments described and illustrated herein.

DETAILED DESCRIPTION OF THE DISCLOSURE

Methods and systems for providing an augmented reality game environment, such as an exergame environment, are described. In some cases, the game environment may be interactive, involving multiple players. The game environment may be configured to present an inclusive environment, in which players of differing levels of mobility, skill, or capability can participate. In some case, the game environment may be or include an exergame environment, in which the players interact with a virtual target object. For example, the virtual target object may be a virtual ball or puck. Interaction with the ball may then involve directing the virtual ball into a virtual goal or net, as in soccer or hockey.

In some cases, the disclosed systems are, or otherwise include, an interactive floor projection system. The projection of a game space on a floor facilitates co-located physical play experiences for people with motor disabilities and their non-disabled peers. The interactive floor systems facilitate whole-body interactions and co-located games. Individuals with motor disabilities thus have opportunities to participative in inclusive recreational sport settings.

The disclosed methods and systems are configured to generate a peripersonal boundary for each player within a game space of the game environment. In accordance with the term "peripersonal," the peripersonal boundary is or otherwise includes a boundary disposed around or about the player. The peripersonal boundary acts as an interaction modality of the game environment. In some cases, the peripersonal boundary provides the mechanism by which a player manipulates or otherwise interacts with a target object or other aspect of the game environment. The peripersonal boundary may be a circle or other shape projected or otherwise rendered, e.g., on the floor, to simulate a player's peripersonal space boundary. As described herein, the player can adjust (e.g., expand) the peripersonal boundary, e.g., through body movement or with a controller (e.g., a push button controller). The adjustment may be directed to manipulating a virtual physical target, e.g., rendered on the floor.

The peripersonal boundary may be one of multiple aspects of the disclosed methods and systems that are configured for, and/or directed to, allowing people with motor disabilities to compete on par with, and in the same environment as, their non-disabled peers. For instance, with the controller, players in power wheelchairs with less upper body strength, for example, can expand the boundary in the same way as players who are capable of extending or otherwise moving their arms or legs in order to kick the simulated target.

The disclosed methods and systems may include additional or alternative player balancing features, including, for instance, parameters directed to game calibration. The game calibration may be implemented on a respective basis for each player. For instance, calibration may be specific to each player and/or to each side of the game space (e.g., playfield). The calibration may be implemented to address player differences in response time, processing speed, and/or other characteristics. Examples of player-customizable game mechanic parameters include the speed of the target, friction applied to the target movement, as well as the sizes of the goal and the player's peripersonal circle representation, but additional, fewer, or alternative parameters may be calibrated or otherwise controlled.

Although described below in connection with examples involving a ball- or puck-shaped target object, the disclosed methods and systems are not limited to a soccer-like environment or format. Other exergame or other game environments may be generated. Such environments may or may not involve a ball, a puck, goals, or nets. The disclosed methods and systems are accordingly well-suited for use in connection with a wide variety of game environments. The environments generated by the disclosed methods and systems may or may not involve a target object.

FIG. 1 depicts an exergame system 100 that generates or provides an augmented reality game environment in accordance with one example. The system 100 may implement one of the disclosed methods, or another method. In this case, the game environment resembles a hybrid of soccer and air hockey. Two or more players attempt to manipulate a moving, virtual target object, e.g., a virtual ball or puck, into an opponent's goal. The players may include individuals with or without mobility challenges, including users of power wheelchairs, manual wheelchairs, a walker, and non-disabled players. The game environment is designed such that the game is accessible and playable for all participants, regardless of how they were paired up. To that end, one or more player or other game parameters may be adjusted, including, for instance, one or more speed-related parameters. For example, the speed at which the target object moves may be customized or otherwise adjusted. The speed may be adjusted to accommodate different levels of player skill and other player characteristics, such as a player's respective information processing speed. Alternative or additional examples are described below.

The system 100 includes a projection system 102. In this example, the projection system 102 is or includes a ceiling mounted video projection system. The video projection system is controlled and/or otherwise configured to render an interactive floor 104. The interactive floor 104 includes an image rendered on a floor or other surface. As described herein, these and other aspects of the system 100 may be configured for, and/or directed to, providing an environment that exhibits (1) affordability and robustness, (2) ease of implementation and potential for scalability, (3) versatility and flexibility of computer software based system implementation, (4) high display speed and accuracy, and (5) good visibility in the typical light levels of exercise environments.

The system 100 includes a computer system 106 directed to controlling the projection system 102 and otherwise generating the game environment. As shown in FIG. 1, the computer system 106 includes a memory 108 in which several instruction sets are stored. In this example, instructions sets are stored for a physics model (e.g., with player specific parameters), object detection (e.g., centroid and boundary detection), peripersonal boundary projection (e.g., circle and target determination), and game audio generation (e.g., sound effects). Further details regarding the functionality provided via the execution of the instruction sets are set forth below. The computer system 106 may include one or more further components to facilitate the execution of the instruction sets, such as a control screen, or display 110.

The computer system 106 of the system 100 generates a peripersonal boundary 112 on the interactive floor 104 for each player. In this example, the peripersonal boundary 112 is or includes a circle disposed around, and spaced from, each player's body. The peripersonal boundary 112 dynamically adapts to the player's body movement and can be used to manipulate the simulated target on the interactive floor 104. The peripersonal boundary 112 thus moves as the player moves. Each peripersonal boundary 112 is displayed or rendered on the floor 104 via the projection system 102. Other shapes, such as non-circular shapes, may be used.

The peripersonal boundaries 112 may be expanded to manipulate a virtual target 114. In this example, the manipulation of the target object 114 simulates a kick of a soccer ball, e.g., into the opponent's goal. The expansion is effectuated through player limb movement and/or with a controller 116, e.g., a push button controller. In the former case, a leg may be kicked outward. In the latter case, the controller 116 may accommodate players unable to perform a kicking motion, as described further herein. The scores are displayed at the center of the playfield.

The peripersonal boundary 112 may provide cognitive and other development benefits for certain individuals.

Guiding the movement of the body though space and manipulating objects involves an integrated neural representation of the body (i.e., the body schema) and of the space around the body (i.e., the peripersonal space). Furthermore, the various input modalities of the peripersonal boundary 112 (e.g., extending limbs and pressing a push button) demonstrate that peripersonal space boundaries may be modulated both by extending limbs or using tools. The interactive game environment provided by the system 100 (and the other systems and methods disclosed herein) presents similar opportunities for peripersonal space boundary modulation and full body illusions. The peripersonal boundary 112 may thus support the shifting of the peripersonal space representation from the physical body to a subjectively experienced virtual body.

Figure 2:
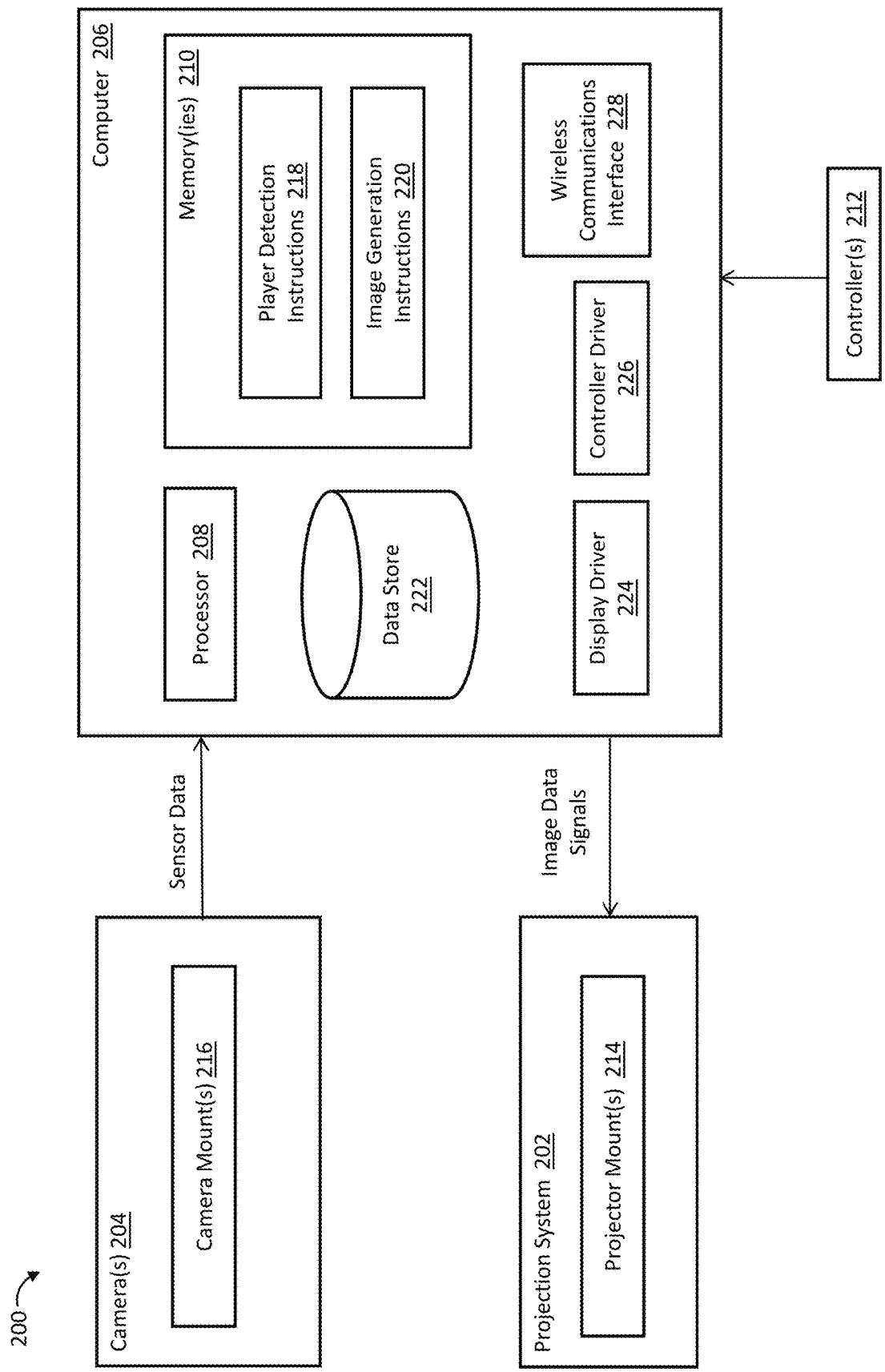
FIG. 2 is a block diagram of a system for providing an augmented reality game environment in accordance with one example.

FIG. 2 depicts a system 200 for providing an augmented reality game environment within a game space. The system 200 may provide the game environment example shown in FIG. 1 and/or other game environments. The system 200 may thus be integrated with the system 100 to any desired extent. The game space may be defined or provided on a medium. In some cases, the medium is or includes a floor. The medium may vary. For instance, other tangible surfaces, such as a display screen of a head-worn display, may be used. Alternatively or additionally, the game space may be provided via, or otherwise include or involve, floating images, such as holographic images.

The system 200 includes a projection system 202, a camera 204, and a computer system 206 having a processor 208 and one or more memories 210. In the example of FIG. 2, the system 200 includes one or more controllers 212. Fewer, additional, or other components may be included. For instance, the system 200 may include one or more tracking devices or components, such as a fiducial marker. The tracking component(s) may be used to differentiate and otherwise track respective players during operation. The tracking component(s) may be useful in example game environments in which multiple players are using the controllers 212.

The projection system 202 is configured to render images in the game space. In some cases, the projection system 202 is mounted above the game space such that the images are rendered on a floor on which the game space is defined and on which the player(s) move. For instance, the projection system 202 may be ceiling mounted. In this case, the projection system 202 includes one or more projector mounts 214. In one example, two ceiling mounted projectors with an integrated loudspeaker (e.g., Epson Pro G7100 XGA 3LCD, 1024×768 pixels, 6500 lumens) are provided to create a 6.3×4.2 meter large projection area on the floor. The projection area may define or establish the game space. Other types of projection systems may be used. For instance, the projection system 202 may be, or otherwise include, a laser-based or other projection system, which may be useful in connection with an outdoor implementation of the game space.

The configuration of the projection system 202 and, thus, the game space, may vary. The game space may or may not be defined on a floor. For example, the projection system 202 may be or include a wearable device, such as head-mounted display. In those and other cases, the game space may be three-dimensional rather than two-dimensional. The projection system 202 may include any number of projectors. For better projection visibility, the floor may be covered with a white skid resistant polyvinyl chloride (PVC) or other covering.

The image data rendered by the projection system 202 may vary in accordance with the game space and environment. In a soccer or air hockey example, the image data is rendered to define or present court lines and other markings, scores, one or more targets, and the peripersonal boundary of each player. Any number or type of visual projections may be provided on the floor. Reducing or minimizing the number of projections (e.g., projecting only minimal visual cues such as line markings instead of full images) may be useful, insofar as players are less likely to obscure a projection. Alternatively or additionally, obstruction may be prevented or otherwise reduced via use of multiple projectors to project images from different angles in the same space. As a result, occlusion is reduced or eliminated.

The camera 204 is configured to capture sensor data for the game space. The sensor data is captured to monitor the players' movements. In the example of FIG. 2, the camera 204 captures graphic frame data (or other camera or sensor data), and then streams or otherwise provides the frame data to the computer 206. For example, the camera 204 may send the frame data at a constant rate of 35 frames per second, although other frame rates may be used. The camera 204 may be or include a ceiling mounted camera, such as a StereoLabs ZED 1280×720 pixel camera. Additional or alternative cameras may be used. In this example, the camera 204 includes one or more camera mounts 216. Other types of optical or non-optical sensors or detectors may be used, including, for instance, depth sensing cameras, laser-based sensor systems, as well as other radar- and lidar-based systems. Sonar-based and other non-electromagnetic sensor systems may alternatively or additionally be used.

The processor 208 is coupled to the camera 206 to receive the captured camera or other sensor data. The processor 208 is also coupled to the projection system 204 to control rendering of the images in the game space. The processor 208 may be or include a general-purpose processor, such as a central processing unit (CPU). In one example, the processor 208 is or includes an Intel Core i7-6700 CPU having eight cores. Additional or alternative processors or processing units may be used. The processor 208 may include any number of processing cores or processors. The configuration and other characteristics of the processor 208 may vary. For instance, the processor 208 may be or include one or more graphic processing units (GPUs) or digital signal processors (DSPs). The GPU(s) and/or the DSP(s) may be integrated with the CPU(s) to any desired extent.

The memory 210 is coupled to the processor 208. The memory 210 may include one or more memory units. For instance, the memory 210 may include any number of addressable memory integrated circuit (IC) chips, such as random access memory (RAM) chips. Additional and/or alternative types of memory units may be used. The memory 210 may be integrated with the processor 208 to any desired extent. For instance, the memory 210 may be or include an on-board memory unit of a processor IC chip.

One or more instruction sets are stored in the memory 210 for execution by the processor 208. In this case, player detection instructions 218 and image generation instructions 220 are stored in the memory 210. The instructions 218, 220 may be integrated to any desired extent. Fewer, additional, or other instructions or instruction sets may be stored on the memory 210. For instance, interface instructions may be provided to generate a user interface on a display of the computer 206. The interface may be directed to customizing or configuring the system 200 via user selection of one or more parameters for the game environment.

The processor 208 is configured via execution of the player detection instructions 218 to determine a position of a player in the game space based on the camera or other sensor data. The camera or other sensor data may be processed in accordance an object detection procedure specified via the player detection instructions 218. An example procedure is described below in connection with FIG. 4. The manner in which the player position is determined may vary.

The processor 208 is configured via execution of the image generation instructions 220 to generate player image data of a peripersonal boundary of the player based on the determined position of the player. The processor 208 is then configured via execution of the image generation instructions 220 to direct the projection system 202 to render the images in accordance with the player image data. The peripersonal boundary is disposed about, and spaced from, the determined position for the player.

The processor 208 is further configured via the execution of the player detection instructions 218 to obtain player data for the player via an input modality. The player data is indicative of a player directive to modulate the peripersonal boundary. In some cases, the player directive is or includes a limb movement, such as a leg kick or other outward thrust of a limb. The limb movement may be detected via further camera or other sensor data captured via the camera 204. The input modality in such cases thus includes or involves the camera 204. The processor 208 may thus be further configured via the execution of the player detection instructions 218 to determine that the further camera data is indicative of an outward kick or other thrust of a limb of the player. Other limb movements may be detected, including, for instance, an arm motion.

With some players, the input modality includes or involves one of the controllers 212 associated with the player. Each controller 212 is configured to be actuated by a respective player such that the player data may include a controller signal from the controller 212. The controller signal is thus indicative of an operational state of the controller. In such cases, the player directive is or includes actuation of the controller 212. For example, a push button of the controller 212 may be pressed by the player. The controller 212 may be worn, held, or otherwise accessible to the player. In some cases, the controller 212 is or includes a transceiver for wireless communications (e.g., Bluetooth communications) with the computer 206. Other wireless protocols may be used.

Each controller 212 may be or include a push-button device. In some cases, the controller 212 may be a handheld device. The controller 212 may have a housing similar to a computer mouse device, in which case the controller 212 may be actuated with a squeezing motion. Alternatively or additionally, the controller 212 may be a wearable device. For example, the controller 212 may include a strap to secure the controller 212 to a side of a knee or leg of the player. The controller 212 may then be actuated by a player via inward motion of the knees. Further details regarding an example of the controller 212 are provided in connection with FIG. 7.

Other input modalities may be used. For instance, an audio signal indicative of the player directive may be captured via a microphone. A player with limited mobility may then be able to speak or otherwise generate a sound to modulate the peripersonal space. Alternatively or additionally, a player with limited mobility may use an input modality involving eye gaze tracking. A head-mounted or other camera may generate data indicative of pupil position, which may then be used to detect a player directive to modulate the peripersonal boundary.

Other types of input modalities may involve the peripersonal boundary. For instance, an input modality may be based on the peripersonal boundary hitting, or otherwise encountering, a further target or symbol projected on the floor. If the peripersonal boundary hits the further target or symbol, an effect, such as a modification of a game parameter, is triggered. In one example, the further target or symbol may be an image of a snail or a rabbit. Hitting the snail symbol decreases the speed of the target object. Hitting the rabbit symbol increases the speed of the target object. Additional or alternative game parameters may be modified. Any game menu, input, or control option may be selected or implemented in this manner. Different games may also be selected. These and other peripersonal boundary-based input modalities may be useful for wheelchair or other participants that may have difficulty using a keyword, mouse, display screen, or other computer-based input interface. The accessibility of the game environment, as well as the autonomy of the participants, are thus further increased.

The processor 208 is further configured via the execution of the image generation instructions 220 to adjust a size of the peripersonal boundary as a function of the player data. For example, when a player executes a leg kick, the player data indicative of the leg kick is used by the processor 208 to expand the peripersonal boundary of the player. Similarly, when a player actuates the controller 212, the player data indicative of the actuation is used by the processor to expand the peripersonal boundary of the player. In either case, the processor 208 updates the player image data based on the adjusted size of the peripersonal boundary.

In some cases, the adjustment includes an expansion of the peripersonal boundary. An example of an expansion is shown in FIG. 1. In that way, the expansion may increase a reach of the player to interact with a target object of the game space. Alternative or additional adjustments may be implemented. For example, the shape of the peripersonal boundary may change. For instance, the peripersonal boundary may extend outward in a direction of a leg kick and/or a direction in which the player is oriented. Thus, the expansion or other adjustment may or may not be uniform or symmetrical.

In game environments involving a target or other object in addition to the peripersonal boundaries, the processor 208 is further configured via the execution of the image generation instructions 220 to determine a position of a simulated object of the augmented reality game environment within the game space. The processor 208 generates object image data of the simulated object for rendering, via the projection system 202, a representation of the simulated object in the game space. Then, during the game, the processor 208 updates the object image data based on a simulated interaction of the simulated object and one of the peripersonal boundaries. For example, the ball or other object may be redirected when the ball overlaps with the peripersonal boundary. The redirection may be intensified if the object interacts with an expanded or otherwise adjusted peripersonal boundary.

The computer 206 may include a number of components, peripheral devices, or other elements. In the example of FIG. 2, the computer 206 includes a data store 222, a display driver 224, a controller driver 226, and a wireless communications interface 228. The data store 222 may be used to store parameter and other data for configuring the game environment. The display driver 224 may be configured to generate image data signals (e.g., pixel signals or other display control signals) to the projection system 202 based on the image data generated by the processor 208. The controller driver 226 may be configured to generate data indicative of user interaction with each controller 212. The wireless communications interface 228 may be or include a Bluetooth or other driver to support wireless communications with the computer 206, such as wireless communications with the controller(s) 212.

The processor 208 may be further configured via the execution of the image generation instructions 220 to access the data store 222 to obtain one or more player parameters. One or more characteristics of the peripersonal boundary may be customized by the parameter(s). The function by which the peripersonal boundary is adjusted may thus take the player parameter as an input. The nature of the player parameter(s) may vary. Examples include parameters that calibrate a speed of expansion of the peripersonal boundary, a maximum size of expansion of the peripersonal boundary, a duration of expansion of the peripersonal boundary, and an elasticity of the peripersonal boundary. Further details regarding examples involving these and other examples are provided below.

The processor 208 may be or include any number or type of processing cores, processors, processing units (e.g., a central processing unit or graphical processing unit), or processing systems. The processor 208 may be or include one or more general processors, digital signal processors, application specific integrated circuits, field programmable gate arrays, servers, networks, digital circuits, analog circuits, combinations thereof, or other now known or later developed devices for analyzing and processing data.

The memory(ies) 210 may be or include any number or type of computer-readable memories, media, or other devices on which data is stored. The memory(ies) 210 may be or include a main memory, a static memory, or a dynamic memory. The memory(ies) 210 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory(ies) 210 may include a cache or random access memory for a processor. Alternatively or additionally, the memory(ies) 210 may be separate from the processor, such as a cache memory of a processor, the system memory, or other memory. The memory(ies) 210 may be or include an external storage device or database for storing data. Examples may include a hard drive, compact disc ("CD"), digital video disc ("DVD"), memory card, memory stick, floppy disc, universal serial bus ("USB") memory device, or any other device operative to store data. The memory(ies) 210 may be operable to store instructions executable by a processor. The functions, acts or tasks illustrated in the figures or described herein may be performed by the programmed processor executing the instructions stored in the memory(ies) 210. The functions, acts or tasks may be independent of the particular type of instruction set, storage media, processor or processing strategy and may be performed by software, hardware, integrated circuits, firmware, micro-code and the like, operating alone or in combination. Likewise, processing strategies may include multiprocessing, multitasking, parallel processing and the like.

Figure 3:
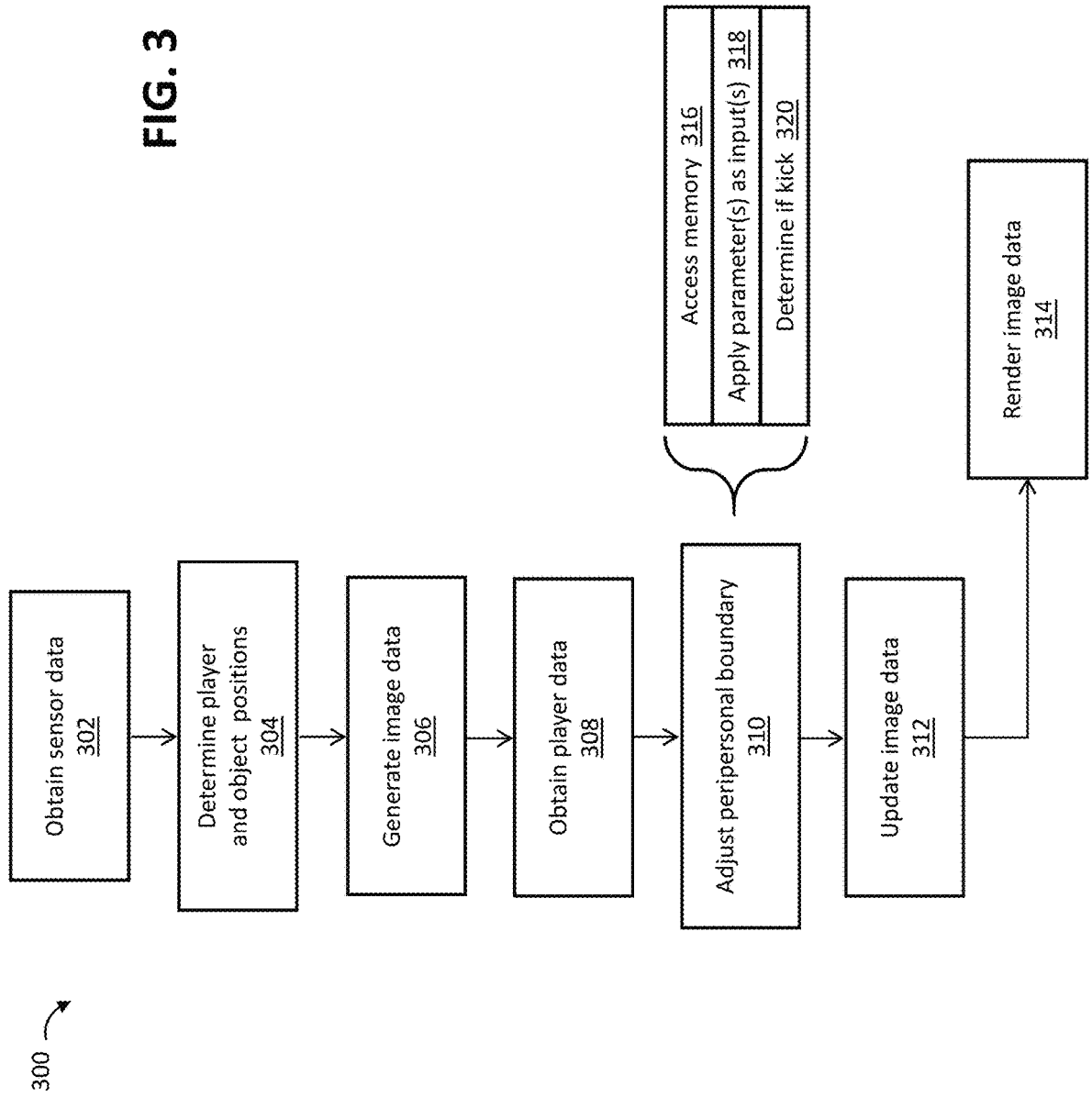
FIG. 3 is a flow diagram of a method for providing an augmented reality game environment in accordance with one example.

FIG. 3 depicts a method 300 of providing an augmented reality game environment within a game space. The method 300 may be implemented by one of the systems, computers, or processors described herein, such as the above-described processor 208 (FIG. 2), and/or another system, computer, or processor. For instance, the method 300 may be implemented via execution of the above-described instructions stored on the memory 210 and/or another memory.

The method 300 may begin with one or more acts directed to configuring the game environment. For example, a user interface may be generated to provide a user with an opportunity to customize one or more game parameters. The user interface may alternatively or additionally be directed to initiating the game environment and/or starting a game.

Upon starting the game, camera or other sensor data is obtained in an act 302 for the game space. The camera or other sensor data may captured via one or more cameras or other sensor systems as described above. The camera data may be provided or configured as frame data in some cases. The manner in which the camera data is obtained may vary. For instance, obtaining the camera data may include receiving raw or other data from the camera, processing the raw data, accessing raw or other data from a memory, and/or other steps.

In an act 304, a position of each player in the game space is determined based on the camera or other sensor data. The position may be a centroid of an area in which one or more objects are detected via analysis of the camera or other sensor data. One example of an object detection technique that may be implemented is described in connection with FIG. 4. Other object detection techniques may be used, including, for instance, techniques that rely on sensor data from radar-, lidar-, and sonar-based sensor data.

In some cases, the act 304 may also include determining a position of one or more simulated objects of the augmented reality game environment within the game space. The object may be or include a simulated ball or puck, as described above. The determination may or may not be made separately (e.g., at a different time in the sequence or method 300) than the player position determination.

Player image data of a peripersonal boundary of each player is generated in an act 306 based on the determined position of the player. The player image data is directed to rendering a representation of the peripersonal boundary in the game space. As described above, the peripersonal boundary is disposed about, and spaced from, the position determined for the player. The representation may be rendered on a floor or other surface or medium. The image data may be configured such that the representation is or includes a real or virtual image. The player image data may be two- or three-dimensional image data.

In some cases, the act 306 also includes generating object image data of the simulated object. The object image data is used for rendering a representation of the simulated object in the game space. The object image data may or may not be generated separately (e.g., at a different time in the sequence or method 300) than the player image data.

In an act 308, player data is obtained for one or more of the players via an input modality. The player data is indicative of a player directive to modulate the peripersonal boundary of the player. The input modality may vary. For instance, the input modality may be or include the camera(s). The player data may thus include or be based on camera data indicative of a kick or other limb movement. The input modality may be or include a handheld, worn, or other controller with a push button or other technique to capture and/or generate the player data (or signal or data underlying the player data). The player data may thus include a controller signal from a controller, the controller signal being indicative of an actuation of the controller by the player. Still other input modalities may be used, including, for instance, sound-based modalities and other visual modalities, such as pupil tracking.

A size of the peripersonal boundary is adjusted in an act 310 as a function of the player data. In some cases, the peripersonal boundary expands as a function of the player data. The expansion may or may not be uniform or symmetrical. For instance, the peripersonal boundary may expand in a direction in which the kick or limb movement is oriented. The expansion may increase a reach of the player to interact with a target object of the game space.

In act 312, the player image data is updated based on the adjusted size of the peripersonal boundary. The player image data for rendering of the peripersonal boundary is updated to reflect the expanded or otherwise adjusted size of the peripersonal boundary.

The updated player image data is rendered into a visible representation in an act 314. Rendering the updated player image data may include providing the image data to a display driver, a projection system, and/or other display system, such as a head-worn display system. The image data may be processed in accordance with one or more graphics and/or display procedures. Rendering the image data may also include one or more acts relating to the generation of pixel control or other signals for the projection system.

Adjusting the peripersonal boundary in the act 310 may include an act 316 in which a data store is accessed to obtain one or more player parameters. The parameter(s) may then be applied in an act 318 as input(s) to the function by which the peripersonal boundary is adjusted. Various player parameters may be used, including, for instance, parameters that calibrate a speed of expansion of the peripersonal boundary, a maximum size of expansion of the peripersonal boundary, a duration of expansion of the peripersonal boundary, and/or an elasticity of the peripersonal boundary in connection with non-player-induced interaction of the peripersonal boundary with a target object. In cases in which a simulated object is present in the game environment, the act 312 may include updating the object image data. The update may be based on a simulated interaction of the simulated object and the adjusted size of the peripersonal boundary.

The act 310 may also include determining, in an act 320, that further camera or other sensor data is indicative of a kick or other outward thrust of a limb of the player. The determination may alternatively be part of a procedure in which the player data is obtained in the act 308.

The method 300 may include fewer, additional, or alternative acts. For instance, the method 300 may include one or more acts directed to adjusting the player parameters. The parameter adjustments may be useful for balancing the game environment, thereby making the environment more accessible and/or interactive for certain players.

The order of the acts of the method 300 may differ from the examples described above. For instance, one or more of the acts may be implemented concurrently.

Figure 4:
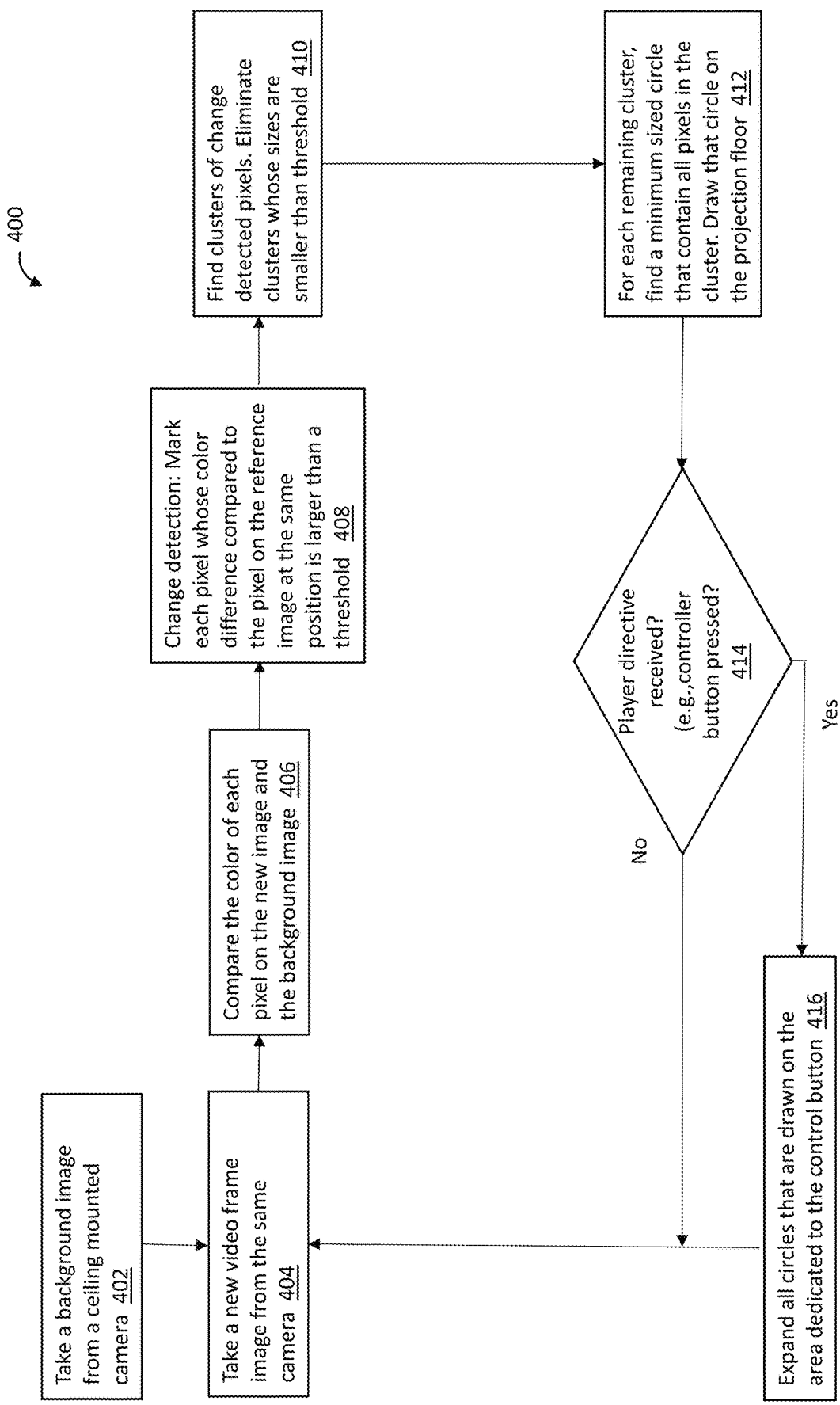
FIG. 4 is a flow diagram of a player detection and image generation procedure implemented by the method of FIG. 3 in accordance with one example.

FIG. 4 depicts a method or procedure 400 for determining player position and generating and updating image data for a peripersonal boundary around the determined position. The procedure 400 may be implemented as part of, or in connection with, the method 300 of FIG. 3, and/or another method. The procedure 400 may be implemented by the processor 208 (FIG. 2) and/or another processor. The procedure 400 may by implemented via execution of the above-described instructions and/or other instructions.

The procedure 400 may begin with an act 402 in which a background image is captured by a camera, such as a ceiling-mounted camera. The act 402 may be implemented before players have entered the game space. Once the game environment is initiated (e.g., a game has started), a new video frame image is captured (e.g., by the same camera) in an act 404. Processing of the image data is then conducted in an act 406. In some cases, the processing includes a comparison of the color of each pixel in the new video frame with the background image data. A change detection routine is then implemented in an act 408. In some cases, each pixel having a color difference larger than a threshold difference is marked or otherwise identified. Clusters of identified pixels are then found in an act 410. Clusters having sizes smaller than a threshold size may be eliminated or discarded. For each remaining cluster, a circle or other boundary is found or otherwise determined in an act 412 such that all of the pixels in the cluster are contained within the boundary. The boundary corresponds with the peripersonal boundary for one of the players. In some cases, minimum and maximum sizes for the boundary are provided. The act 412 may also include generating the image data to draw or otherwise render the boundary for projection on the floor. A decision block 414 then determines whether a player directive to expand the peripersonal boundary is received. The player directive may be or include limb motion or an actuation of a controller button. If yes, control passes to an act 416, in which any boundary(ies) dedicated or otherwise associated with the controller or player are expanded. Otherwise, or eventually, control returns to the act 404 for a another iteration of the procedure 400, starting with a new video frame image.

Figure 7:
FIG. 7 is a photographic, perspective view of a controller of the disclosed systems for use in the augmented reality game environment in accordance with one example.

Other procedures may be used to project or otherwise render a circle or other boundary on the floor or other medium around each detected player that enters the playfield. For instance, a procedure that uses the weighted average of all the pixels constituting the shape of the detected player may be used. The center of each peripersonal boundary may be initially obtained by the weighted average of coordinates of all the pixels constituting the shape of the detected player. Alternatively or additionally, trimming and/or dilation may be implemented on the detected player shape. The size of each circle may be refined via the trimming and dilation process performed on the detected player shape. The center and size of each circle may then be corrected to compensate for perspective distortion that depends on the position of the detected player. As a result, the center of the circle or other boundary travels, and the perimeter expands or contracts based on the player's movement representing the peripersonal space boundary. For example, players' arm extension or kicking motion increases the area of active pixels of the detected player and expands the circle projection around the body on the floor accordingly. This responsive circle can be used to directly manipulate, for example, a virtual ball or puck target on the floor. Likewise, a player using mobility aids can use a wireless push controller to expand the peripersonal circle representation and achieve the same effect. The push button controller may be attached to the body (e.g., hand, finger, torso, or leg mounted) or a mobility aid. The controller may be a modified Bluetooth wireless mouse that allows plugging in switches with different form factors, as shown in FIG. 7. In one example, the controller includes switches with an activation surface of 2.5 cm and 3.5 cm diameter. Both switches provide an auditory click and tactile feedback.

The disclosed methods and systems may be configured to allow game calibration, such as individualized game calibration. As shown in FIG. 1, the disclosed methods and systems may have an adjustable game mechanic (or physics) model. The model may be established via a number of parameters. For example, one or more parameters may be directed to allow realistic and fast-paced interaction with a target object, such as a virtual ball or puck. Alternatively or additionally, the physics model and parameters may be directed to allow player differences to be balanced in response time or processing speed or other ways. To that end, game mechanic parameter calibration may be implemented or customized for each player and/or each side of the playfield individually. In the above-described soccer game, the playfield may be divided into two parts, each dedicated to one player.

Examples of calibration parameters that may be used for game play adjustment and player balancing are listed in Table 1 below.

TABLE 1

|  | Default* | Max. |
| --- | --- | --- |
| Global Parameters |  |  |
| Diameter of the target (m) | 0.36 | 0.94 |
| Individual Parameters for each Player & Playfield side |  |  |
| Minimal speed of the target (m/s) | 0.1 | 0.9 |
| Maximal speed of the target (m/s) | 11.5 | 13.8 |
| Goal size for scoring (m) | 2.8 | 4.2 |
| Friction on the playfield (m/s$^2$) | 0.25 | 1.7 |
| Elasticity of playfield boundary for the contact with the target (%)** | 100 | 100 |
| Elasticity of peripersonal circle boundary for the contact with the target** | 100 | 100 |
| Individual Parameters for Push Button Controller |  |  |
| Max diameter of peripersonal circle when expanded (m) | 3.2 | 4.2 |
| Speed of peripersonal circle expansion (m/s) | 20 | 20 |
| Max hold time of expanded peripersonal circle (s) | 3.1 | 3.1 |

*Parameter baseline used in default environment
**The speed changes to a certain percentage of the original one The maximum speed of the target and the size of the goal may be used to set the overall pace and difficulty of the game. Playfield friction may determine how fast the target decelerates on each side of the playfield. Applying a higher friction setting on one side would make the target move slower when it enters that region. The elasticity parameter may determine the deceleration of the target on each side of the playfield when it contacts the peripersonal circle or playfield boundary. One or more parameters may be related to the push button controller. For example, parameters may be used to set the speed with which the peripersonal circle expands, the maximum size it expands to, and the maximum hold time or duration it can be kept expanded (e.g., to defend a goal). Additional, fewer, or alternative parameters may be used.

The adjustment of the parameters on an individual basis (e.g., individual player basis) and/or in connection with other aspects of the disclosed systems and methods may provide a high level of accessibility for people of different mobility levels, including players using various mobility aids, such as power wheelchairs, manual wheelchairs, and walkers. Furthermore, in testing of one example of the disclosed systems and methods, the adjustment of several of the above-described parameters allowed players of a wide range of ages to be accommodated (e.g., between seven and 19 years old). Participants included five power wheelchairs users, two manual wheelchairs users, one person using a walker, and two people without disabilities.

Figure 5:
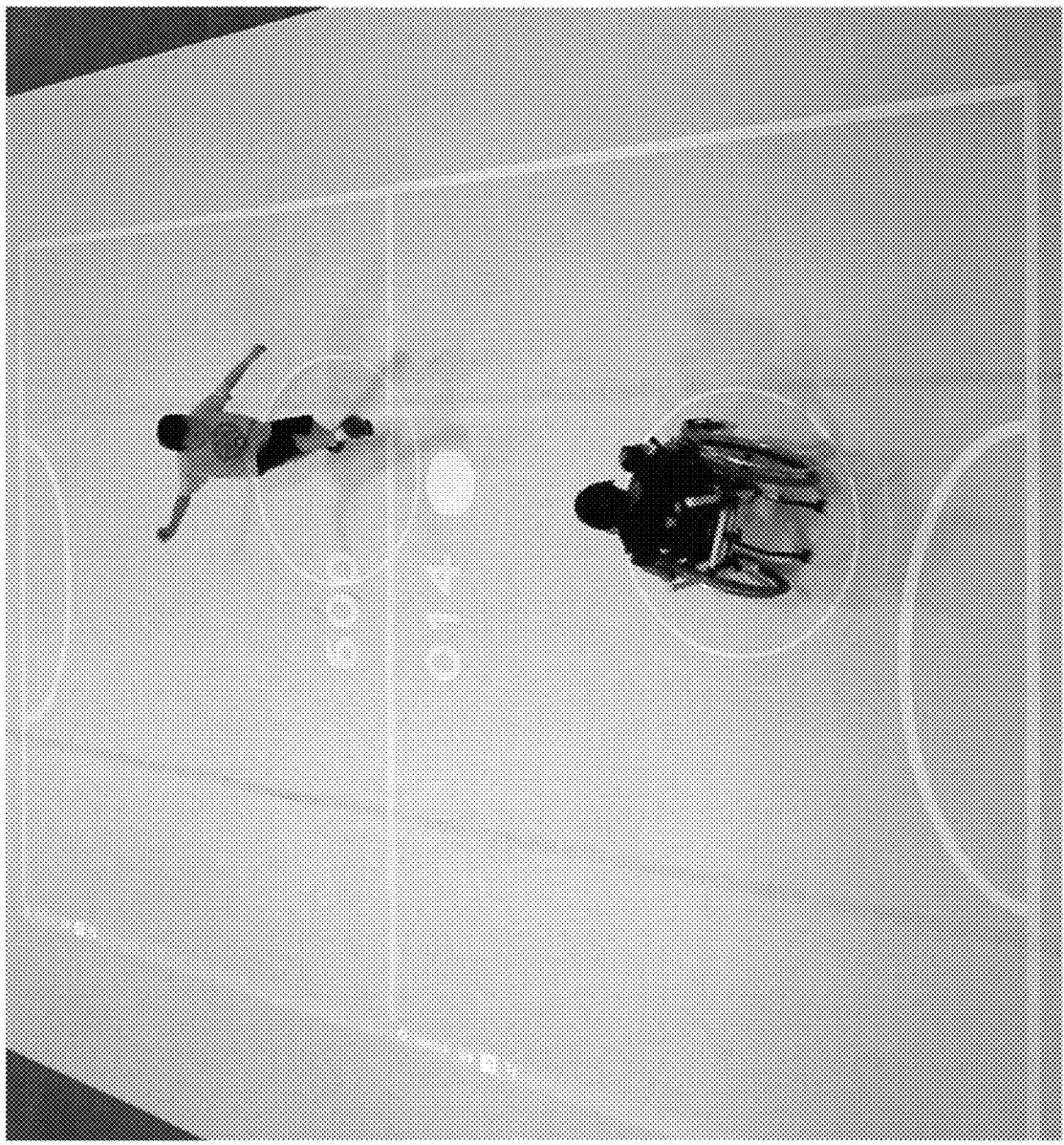
FIGS. 5 and 6 are photographs of an augmented reality game environment that may be generated by the disclosed methods and systems in accordance with one example.
Figure 6:

FIGS. 5 and 6 depict examples of how the increased level of accessibility allows players with different mobility levels to play against, and interact with, each other. The parameters may be used to calibrate the game environment, thereby making the game more playable and enjoyable for each of the participants. Examples of player combinations include the following:

1. Manual wheelchair user vs. Manual wheelchair user
2. Power wheelchair user vs. Power wheelchair
3. Power wheelchair user vs. Manual wheelchair user
4. Power wheelchair user vs. Non-disabled player
5. Manual wheelchair user vs. Non-disabled player Another aspect of the disclosed systems and methods that improves accessibility involves different mounting positions of the controllers described herein (e.g., push button controller). The controller may be configured such that the controller is disposed in a hand-, torso-, or leg-mounted position. Other positions may be used, including positions on a mobility aid, such as a walker handle. The configuration of the controller may include or involve varying the size of the switch (e.g., button switch). For example, the activation surface of the controller may vary (e.g., 2.5 cm and 3.5 cm). For example, a smaller switch (e.g., button switch) may be mounted on the index finger of participants using manual wheelchairs. In this way, the participant may activate the switch while pushing the wheelchair handrims. For example, a participant using a walker may have the switch mounted on the right handle. Other participants, such as those using power wheelchairs, may use a controller with a larger switch with one hand placed on their lap, while the other hand controlled the wheelchair's joystick. In another example, a power wheelchair participant may have the controller mounted on or about a knee, in which the switch of the controller may be activated when the knees are pressed together. For the knee switch mounting position, a controller having a larger activation surface (e.g., button surface) may be useful.

FIG. 6 shows an example of a game environment 600 in which two different controller mounting positions are employed. A player 602 has a controller 604 in a knee-mounted position. A player 606 has a controller 608 in a handheld, or hand-mounted, position. In this example, the hand-mounted position is positioned for actuation with a finger, such as an index finger.

Figure 8:
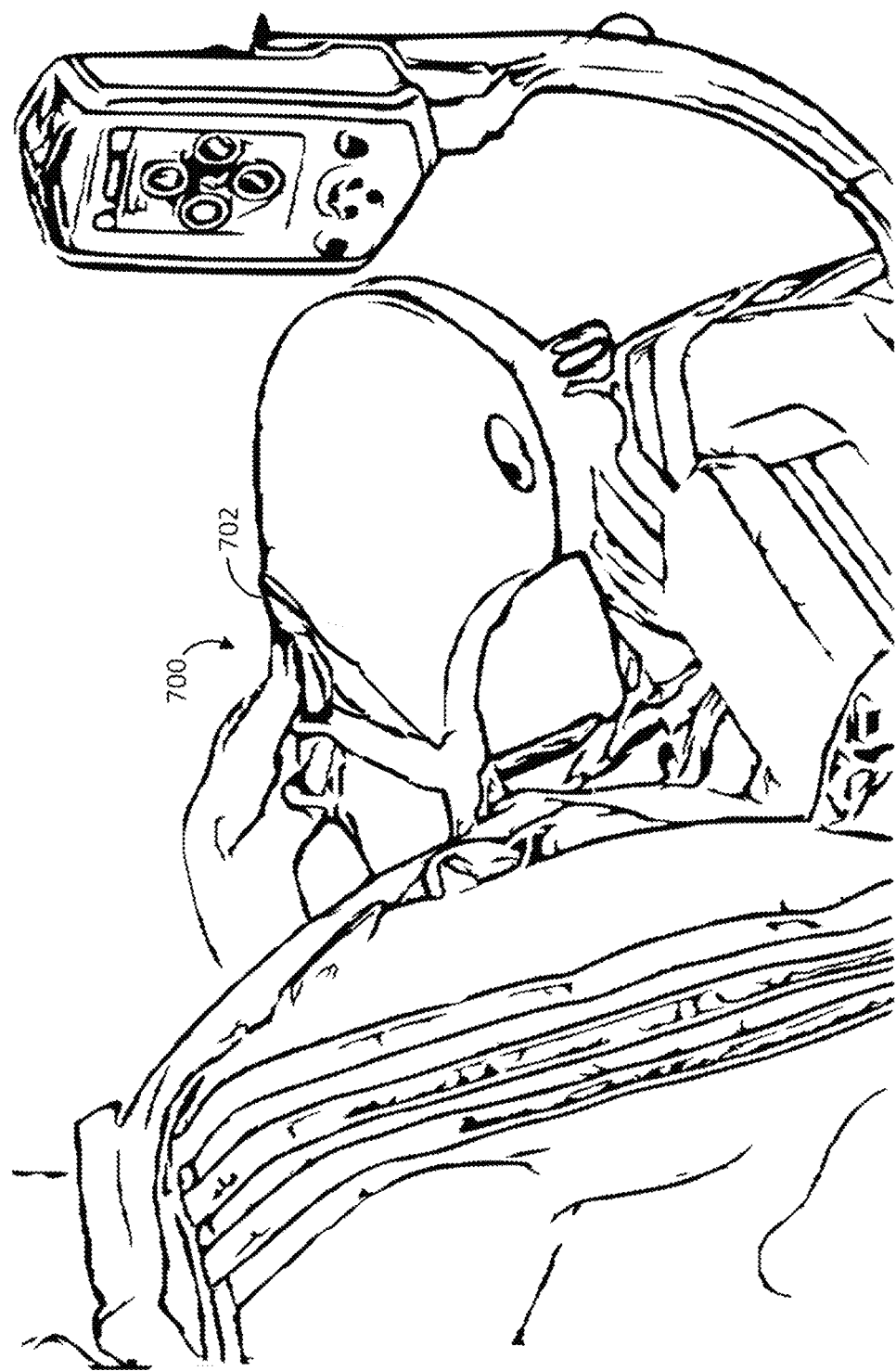
FIGS. 8 and 9 are photographic, perspective views of optional mounting or handheld arrangements for the controller of FIG. 7.
Figure 9:
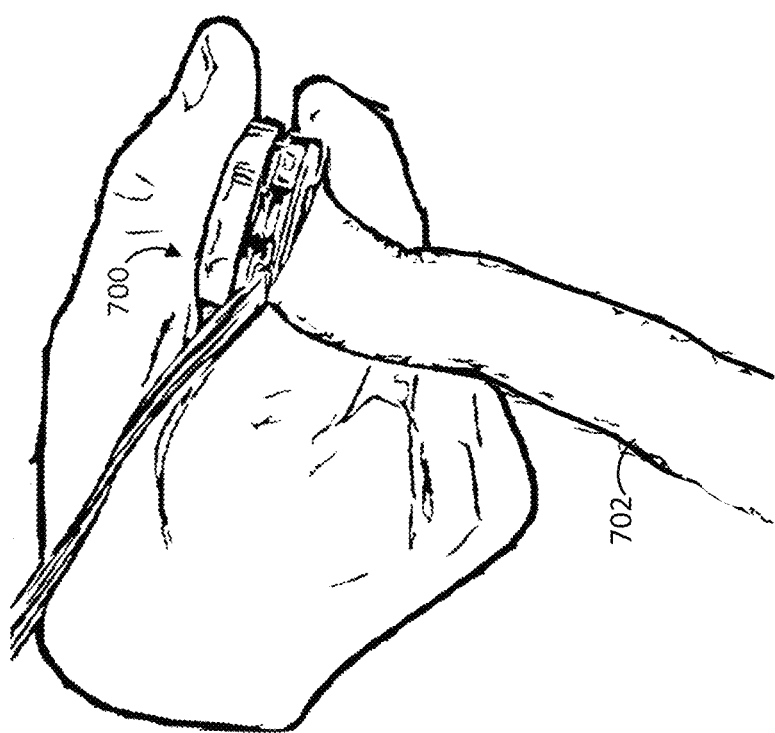
Figure 10:
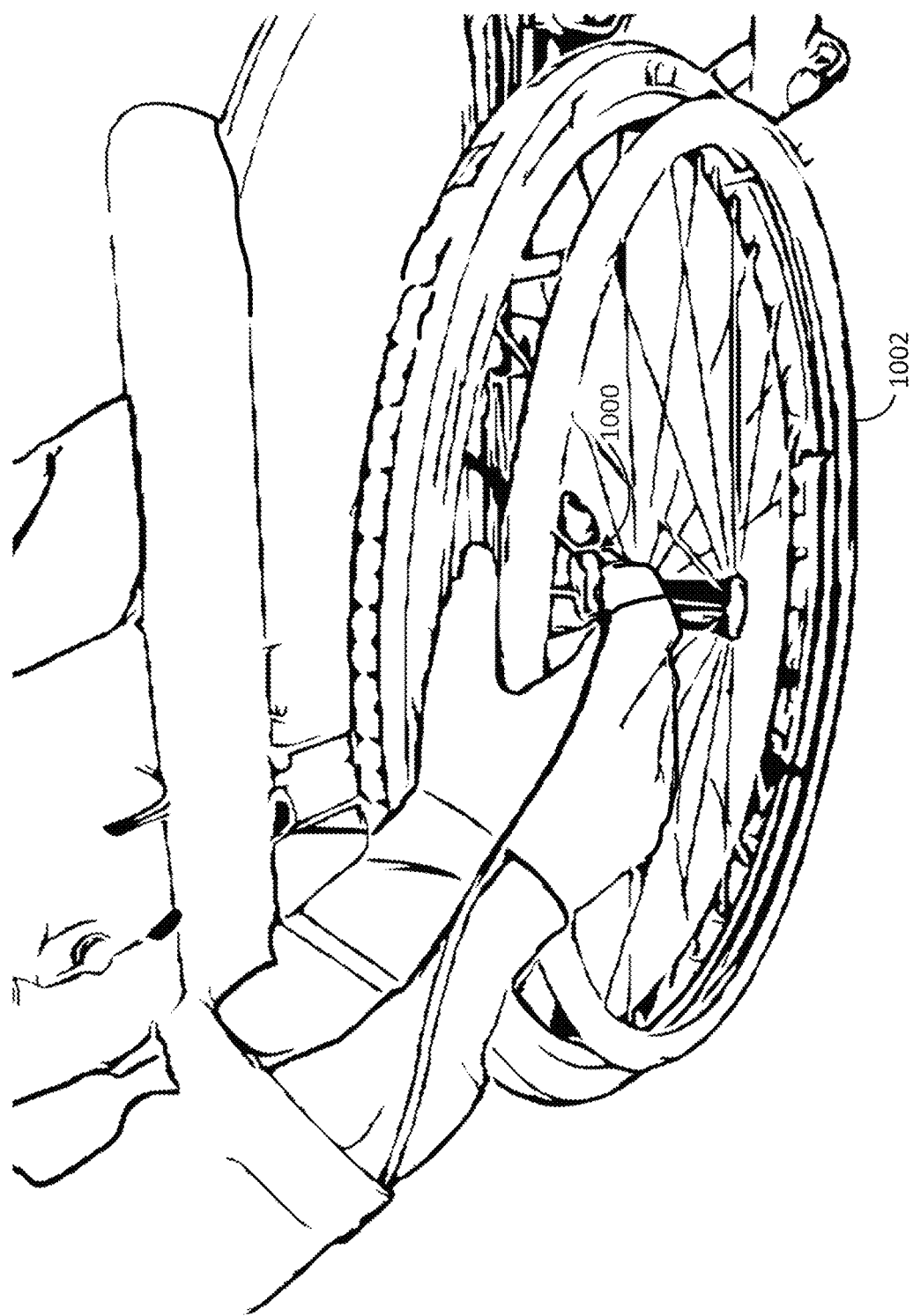
FIG. 10 is a photographic, perspective view of a controller of the disclosed systems in a mounting arrangement in accordance with another example.

FIGS. 7-10 show further examples of optional mounting arrangements for the controller. In FIG. 7, a controller 700 includes a strap 702, such as a hook and loop strap, for securing the controller to a finger or other body part or object. FIG. 8 depicts the controller 700 of FIG. 7 with the strap 702 secured to a wheelchair platform. FIG. 9 depicts the controller 700 of FIG. 7 with the strap 702 wrapped around one or more fingers of a player. FIG. 10 depicts a controller 1000 disposed in an alternative finger mounting arrangement in which the controller 1000 is actuated by pressing the controller 1000 against a wheelchair rim 1002 or other object.

A number of aspects and features of the disclosed systems and methods may increase playability and utility. Further details and examples of such features or aspects are set forth below.

In some cases, the peripersonal circle may expand uniformly. Uniform expansion may allow each player to develop different movement and target manipulation strategies based on player skills and respective mobility aids. For example, some wheelchair participants may activate the push button controller while moving in a direction other than toward the goal, e.g., sideways across the playfield. Such strategies may be used to kick or to defend a goal. Other participants made more turns and confronted the target and opponent heads on.

A click-and-hold function of the push button controller may enable participants with mobility aids to perform similar gameplay behavior as their non-disabled peers. For instance, the controller may enable a participant to push the button for a kick or hold the button down to keep the peripersonal circle or other boundary expanded. This click-and-hold function may be intuitive to use, for example, to block an opponent's kick or defend the goal. In these and other ways, the push button controller and the peripersonal boundary features may render the game more fair for participants of differing abilities.

The intuitive use of the peripersonal boundary feature may simulate a realistically physical play experience when the target is in front of the participants.

In some cases, if two or more players are in close proximity to each other, their peripersonal boundaries may merge into one larger circle. This effect may be eliminated or otherwise controlled via incorporation of player identification (ID) tracking, thereby enabling competitive multi-player team sport scenarios. Alternatively or additionally, this feature may encourage new forms of collaborative behaviors, such as players inviting other players to join their peripersonal circle to cover more surface area, for example, to more effectively defend a goal.

Several tests were conducted to exhibit the degrees to which the game environment is affected by adjustments to the parameters described herein. Different parameters achieved different levels of player balancing. Most effective were the parameters relating to changing the size of the goal and the maximum size of the peripersonal circle as well as its expansion speed (i.e. "kicking" power). Changing the maximum target speed, playfield friction or elasticity parameters helped to set the overall pace of the game, but was often less comprehensible and more difficult to use for manually balancing player's individual abilities. Further, some participants had the tendency to adapt their gameplay to their opponent. For example, one participant started by playing easy and got more competitive as the game went on. Another participant tried to teach the opponent by showing how to best play the game. These cooperation and self-balancing behaviors reminded one of a soccer pick-up game in which players with different abilities seek to find a competitive yet mutually satisfying way to play together. These interactions may be useful and beneficial apart from the goal of achieving a balanced game environment through physics model adjustments. The disclosed systems and methods may thus provide an inclusive environment for individuals with mobility limitations.

Other aspects of the game environments generated by the disclosed methods and systems also promote an inclusive sports experience. For instance, the virtual nature of the target object may promote inclusivity. For example, the virtual nature of the target object avoids a sports experience in which players may get embarrassed when hit by a ball, as in walker soccer.

The disclosed systems and methods are designed to build on players' ability to see, hear, and have response capability to play and evaluate the game regardless of if they use a mobility aid, or what kind of mobility aid they use. Significant improvements in accessibility and playability of the game (e.g. ability to score and defend goals) are achieved relative to other activities.

The peripersonal boundary feature and individualized game calibration may be useful with other types of participants. The benefits are not limited to manual wheelchair users and power wheelchair users.

The peripersonal boundary provides a universal design element for fast-paced manipulation of virtual targets on interactive floors. The use of a circle presents the risk of accidently manipulating the target behind a player's back. Other non-uniform, scalable, peripersonal space representations, in which the players have no or less active space behind their backs, may be used to address that risk.

The accessibility of the game environment may be achieved despite high target speeds. In testing, the game unexpectedly remained playable at high target speeds. The general significance of the target speed is that it defines the pace of a game and a player's performance. In the tests, the target speed turned out to be a useful measure, because it connects to other findings related to the relative success of different player balancing efforts and social factors. For example, when the playtests were designed, it was anticipated that the maximum target speed would be one of the parameter that has to be calibrated most to address players' individual abilities. Instead, it was found that the maximum target speed parameters in all playtest categories may be left relatively close to the upper speed threshold of the system for both players on the field. More actual player balancing was achieved by changing the goal size and the size of the peripersonal circle as well as its expansion speed (i.e. kicking power) for player using the push button controller. These alternative system balancing measures may be one of the reasons why maximum target speed parameters may largely be left untouched and ended up being higher than anticipated.

Related to the inclusivity of the game environments generated by the disclosed methods and systems is the notion of fairness, which was evident in the test results. Fairness was a reason why the players found the peripersonal boundary feature and the push button controller appealing to use. The perceived fairness of the game environment from the player's perspective seems to also align with the fairness "optic" from the observer and spectator's perspective, which shows every player with the same peripersonal circle represented on the playfield.

The disclosed systems and methods are not limited to the examples described above. Alternative features may be incorporated, including, for instance, tracking a player identification code (ID) to enable multiplayer games with more than two players, and full integration of the push button controller as a wearable and/or chair-able input device. In some cases, the controller may be integrated into the joystick of power wheelchairs. Still other options involve a floor-projected user interface that enables players to start or change games or balance certain parameters such as their "kicking power" automatically or by player direction.

In some cases, the disclosed methods and systems may include further or alternative interaction scenarios. For instance, the target itself may include a structural component, such as a robotic disc, as well as an image-based component, e.g., a projected circle around the disc. The projection may be achieved through, e.g., laser projection. The circle may be used for directly manipulating the disc without touching the disc. This scenario provides another example of object manipulation, and may be useful in connection with game environments having slower moving objects and/or robots.

The disclosed methods and systems provide an interactive floor projection system that enables co-located physical play for people with motor disabilities and their non-disabled peers. Playtests indicated that the peripersonal circle interaction feature was useful for system playability at overall higher than anticipated target speeds for all 10 participants. Regardless of what type of, or if, a mobility aid was used, the peripersonal circle feature provided all players equal access, kicking power, and similar target manipulation opportunities. Further, the sizes of the peripersonal circle and goal were a more significant variable for player balancing than adapting the maximum target speeds; and social factors such as players' self-balancing behavior and their relationships had also significant impact on the gameplay. Our design features and related findings have theoretical and practical implications for creating novel, inclusive exergame opportunities.

The disclosed methods and systems provide physical play opportunities for people with motor disabilities that include co-located play with non-disabled peers. The disclosed methods and systems provide an interactive floor projection system for inclusive exergames, which enables people with motor disabilities to compete on par with, and in the same environment as, their non-disabled peers. Multiple system features, e.g., player balancing and peripersonal circle interaction, enable individualized game calibration and fast-paced manipulation of virtual targets on the floor. Playtests were conducted with various participants, including users of power wheelchairs, manual wheelchairs, a walker, and non-disabled players. The playtests showed overall playability with similar high target speeds. Adapting the maximum target speeds was less significant for addressing players' individual abilities than changing the sizes of their peripersonal circles or goals.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. A method of providing an augmented reality game environment within a game space, the method comprising:
    obtaining, by a processor, sensor data for the game space;
    determining, by the processor, a position of a player in the game space based on the sensor data;
    generating, by the processor, player image data of a peripersonal boundary of the player based on the determined position of the player for rendering a representation of the peripersonal boundary in the game space, the peripersonal boundary being disposed about, and spaced from, the determined position;
    simulating interaction of the peripersonal boundary with a target object of the augmented reality game environment within the game space such that the peripersonal boundary acts as an input modality and mechanism by which the player manipulates the target object based on the peripersonal boundary hitting the target object;
    obtaining, by the processor, player data for the player via an input modality, the player data being indicative of a player directive to modulate the peripersonal boundary;
    adjusting, by the processor, a size of the peripersonal boundary as a function of the player data; and
    updating, by the processor, the player image data based on the adjusted size of the peripersonal boundary.

2. The method of claim 1, wherein the adjusted size of the peripersonal boundary comprises an expansion of the peripersonal boundary, the expansion increasing a reach of the player to interact with the target object of the game space.

3. The method of claim 1, wherein the player data comprises a controller signal from a controller, the controller signal being indicative of an actuation of the controller by the player.

4. The method of claim 1, wherein adjusting the peripersonal boundary comprises accessing a data store to obtain a player parameter, such that the function by which the peripersonal boundary is adjusted takes the player parameter as an input.

5. The method of claim 4, wherein the player parameter calibrates a maximum size of expansion of the peripersonal boundary.

6. The method of claim 1, wherein:
    the input modality comprises a sensor system such that the player data comprises further sensor data;
    adjusting the size of the peripersonal boundary comprises determining, by the processor, that the further sensor data is indicative of an outward thrust of a limb of the player.

7. The method of claim 1, further comprising:
    determining, by the processor, a position of the target object of the augmented reality game environment within the game space;
    generating, by the processor, object image data of the target object for rendering a representation of the target object in the game space; and
    updating the object image data based on the simulated interaction of the target object and the adjusted size of the peripersonal boundary.

8. The method of claim 1, further comprising rendering, by the processor, a visible representation of the player image data.

9. The method of claim 1, further comprising projecting, via a projection system, a representation of the player image data on a floor on which the game space is defined and on which the player moves.

10. The method of claim 1, further comprising implementing a control option of the augmented reality game environment upon interaction of the peripersonal boundary with a symbol of the augmented reality game environment within the game space.

11. The method of claim 1, further comprising modifying a game parameter of the augmented reality game environment upon interaction of the peripersonal boundary with a symbol of the augmented reality game environment within the game space.

12. A method of providing an augmented reality game environment within a game space, the method comprising:
    obtaining, by a processor, sensor data for the game space;
    determining, by the processor, a position of a player in the game space based on the sensor data;
    generating, by the processor, player image data of a peripersonal boundary of the player based on the determined position of the player for rendering a representation of the peripersonal boundary in the game space, the peripersonal boundary being disposed about, and spaced from, the determined position;
    obtaining, by the processor, player data for the player via an input modality, the player data being indicative of a player directive to modulate the peripersonal boundary;
    adjusting, by the processor, a size of the peripersonal boundary as a function of the player data; and
    updating, by the processor, the player image data based on the adjusted size of the peripersonal boundary;

wherein adjusting the peripersonal boundary comprises accessing a data store to obtain a player parameter, such that the function by which the peripersonal boundary is adjusted takes the player parameter as an input, and wherein the player parameter calibrates a speed of expansion of the peripersonal boundary.

13. A method of providing an augmented reality game environment within a game space, the method comprising:
obtaining, by a processor, sensor data for the game space;
determining, by the processor, a position of a player in the game space based on the sensor data;
generating, by the processor, player image data of a peripersonal boundary of the player based on the determined position of the player for rendering a representation of the peripersonal boundary in the game space, the peripersonal boundary being disposed about, and spaced from, the determined position;
obtaining, by the processor, player data for the player via an input modality, the player data being indicative of a player directive to modulate the peripersonal boundary;
adjusting, by the processor, a size of the peripersonal boundary as a function of the player data; and
updating, by the processor, the player image data based on the adjusted size of the peripersonal boundary;
wherein adjusting the peripersonal boundary comprises accessing a data store to obtain a player parameter, such that the function by which the peripersonal boundary is adjusted takes the player parameter as an input, and
wherein the player parameter calibrates a duration of expansion of the peripersonal boundary.

14. A method of providing an augmented reality game environment within a game space, the method comprising:
obtaining, by a processor, sensor data for the game space;
determining, by the processor, a position of a player in the game space based on the sensor data;
generating, by the processor, player image data of a peripersonal boundary of the player based on the determined position of the player for rendering a representation of the peripersonal boundary in the game space, the peripersonal boundary being disposed about, and spaced from, the determined position;
obtaining, by the processor, player data for the player via an input modality, the player data being indicative of a player directive to modulate the peripersonal boundary;
adjusting, by the processor, a size of the peripersonal boundary as a function of the player data; and
updating, by the processor, the player image data based on the adjusted size of the peripersonal boundary;
wherein adjusting the peripersonal boundary comprises accessing a data store to obtain a player parameter, such that the function by which the peripersonal boundary is adjusted takes the player parameter as an input, and
wherein the player parameter calibrates an elasticity of the peripersonal boundary in connection with non-player-induced interaction of the peripersonal boundary with the target object.

15. A system for providing an augmented reality game environment within a game space, the system comprising:
a projection system to render images in the game space;
a sensor system to capture sensor data for the game space;
a processor coupled to the sensor system to receive the captured sensor data and to the projection system to control rendering of the images; and
a memory coupled to the processor and in which player detection instructions and image generation instructions are stored;
wherein the processor is configured via execution of the player detection instructions to determine a position of a player in the game space based on the sensor data;
wherein the processor is configured via execution of the image generation instructions to generate player image data of a peripersonal boundary of the player based on the determined position of the player and to direct the projection system to render the images in accordance with the player image data, the peripersonal boundary being disposed about, and spaced from, the determined position;
wherein the processor is further configured to simulate interaction of the peripersonal boundary with a target object of the augmented reality game environment within the game space such that the peripersonal boundary acts as an input modality and mechanism by which the player manipulates the target object based on the peripersonal boundary hitting the target object;
wherein the processor is further configured via the execution of the player detection instructions to obtain player data for the player via an input modality, the player data being indicative of a player directive to modulate the peripersonal boundary;
wherein the processor is further configured via the execution of the image generation instructions to adjust a size of the peripersonal boundary as a function of the player data and update the player image data based on the adjusted size of the peripersonal boundary.

16. The system of claim 15, wherein the adjusted size of the peripersonal boundary comprises an expansion of the peripersonal boundary, the expansion increasing a reach of the player to interact with the target object of the game space.

17. The system of claim 15, further comprising a controller configured to be actuated by the player as the input modality, such that the player data comprises a controller signal from the controller, the controller signal being indicative of an actuation of the controller by the player.

18. The system of claim 15, wherein the processor is further configured via the execution of the image generation instructions to access a data store to obtain a player parameter, such that the function by which the peripersonal boundary is adjusted takes the player parameter as an input.

19. The system of claim 18, wherein the player parameter calibrates a speed of expansion of the peripersonal boundary, a maximum size of expansion of the peripersonal boundary, a duration of expansion of the peripersonal boundary, or an elasticity of the peripersonal boundary.

20. The system of claim 15, wherein:
the sensor system provides the input modality for the player such that the player data comprises further sensor data;
wherein the processor is further configured via the execution of the player detection instructions to determine that the further sensor data is indicative of an outward thrust of a limb of the player.

21. The system of claim 15, wherein the processor is further configured via the execution of the image generation instructions to:
determine a position of the target object of the augmented reality game environment within the game space;
generate object image data of the target object for rendering, via the projection system, a representation of the target object in the game space; and
update the object image data based on the simulated interaction of the target object and the adjusted size of the peripersonal boundary.

22. The system of claim 15, wherein the projection system is mounted above the game space such that the images are rendered on a floor on which the game space is defined and on which the player moves.

* * * * *